United States Patent
Narayanasamy et al.

(10) Patent No.: US 12,009,769 B2
(45) Date of Patent: Jun. 11, 2024

(54) HARDWARE BASED MOTOR DRIVE CONTROLLER

(71) Applicant: Texas Instruments Incorporated, Dallas, TX (US)

(72) Inventors: Navaneeth Kumar Narayanasamy, Sugarland, TX (US); Martin Staebler, Freising (DE)

(73) Assignee: Texas Instruments Incorporated, Dallas, TX (US)

( * ) Notice: Subject to any disclaimer, the term of this patent is extended or adjusted under 35 U.S.C. 154(b) by 33 days.

(21) Appl. No.: 18/054,974

(22) Filed: Nov. 14, 2022

(65) Prior Publication Data
US 2023/0072415 A1    Mar. 9, 2023

Related U.S. Application Data

(63) Continuation of application No. 17/137,598, filed on Dec. 30, 2020, now Pat. No. 11,502,629.

(51) Int. Cl.
*H02P 7/29* (2016.01)
*H02P 7/03* (2016.01)

(52) U.S. Cl.
CPC . *H02P 7/29* (2013.01); *H02P 7/04* (2016.02)

(58) Field of Classification Search
CPC .. H02P 7/29; H02P 7/04; H02P 29/024; H02P 27/08

USPC .............. 318/400.17, 400.01, 700
See application file for complete search history.

(56) References Cited

U.S. PATENT DOCUMENTS

| | | | |
|---|---|---|---|
| 5,889,376 A | 3/1999 | Takatsuka et al. | |
| 7,402,969 B2 | 7/2008 | Disser et al. | |
| 7,597,679 B2 | 10/2009 | Jespersen et al. | |
| 8,643,419 B2 | 2/2014 | Rueger | |
| 9,831,815 B2 * | 11/2017 | Suzuki | H02P 3/12 |
| 2020/0244207 A1 | 7/2020 | Kaidu et al. | |

FOREIGN PATENT DOCUMENTS

| | | |
|---|---|---|
| JP | 6148015 A | 3/1986 |
| WO | 2020143142 A1 | 7/2020 |

OTHER PUBLICATIONS

International Search Report for PCT/US2021/065284 dated Apr. 7, 2022. 3 pages.

* cited by examiner

*Primary Examiner* — David Luo
(74) *Attorney, Agent, or Firm* — Michael T. Gabrik; Frank D. Cimino

(57) ABSTRACT

A motor system with an input for coupling to a motor control signal that, when presented in a predetermined state, indicates a motor receiving power should be disabled from rotating. The system also includes controller circuitry for providing a disabling signal to motor rotation, independent of processor software control signaling and the power, in response to the control signal.

20 Claims, 4 Drawing Sheets

HARDWARE BASED MOTOR DRIVE CONTROLLER

CROSS-REFERENCE TO RELATED APPLICATION

This application is a continuation of patent application Ser. No. 17/137,598, filed Dec. 30, 2020, which is incorporated by reference herein in its entirety.

BACKGROUND

The example embodiments relate to a motor drive controller and, more particularly, to a hardware based safety controller.

Motor drive controllers are used to control motors in a wide range of applications, such as computer numerical control (CNC) lathes, machining centers, grinders, process control, and so forth. Often the motor, controlled by the controller, is part of machinery for which safety is a concern. In addition, standards or regulations may specify safety considerations, such as provided by the International Electrotechnical Commission (IEC). Accordingly, a motor drive controller typically includes integrated safety functionality that can replace the time-consuming and expensive installation of external motor-control safety components, like mains contactors or motor contactors. In addition, electronic switching times in a motor drive controller are significantly quicker than electromechanical devices, such as contactors or relays.

A typical motor drive controller will detect a condition and, in response, disable the rotating magnetic field supplied to the motor, so that the controlled motor coasts to a standstill. In the prior art, the controller may include a software-programmed microprocessor for such purposes, which detects certain conditions and, rather than disabling AC power to the motor as a whole, disables the field, for example by disabling one or more transistors in the field-supplying controller. The conditions detected by the microprocessor may vary, for example including when the motor speed increases beyond a threshold. The microprocessor requires software diagnostics to evaluate various signal conditions for such control, and getting the software certified may be a complicated and not always desirable process.

Accordingly, example embodiments are provided in this document that may improve on various of the above considerations as well as other concepts, as further detailed below.

SUMMARY

In one embodiment, there is a system. The system comprises a signal input configured to receive a motor control signal. The system also comprises a watchdog timer having a watchdog timer input coupled to the signal input. The system also comprises a gate buffer having a control input coupled to an output of the watchdog timer and configured to output a gate driver signal.

In another embodiment, there is motor system. The system comprises an input for coupling to a motor control signal that, when presented in a predetermined state, indicates a motor receiving power should be disabled from rotating. The system also comprises controller circuitry for providing a disabling signal to motor rotation, independent of processor software control signaling and the power, in response to the control signal.

Other aspects are also disclosed and claimed.

DETAILED DESCRIPTION

Figure 1:
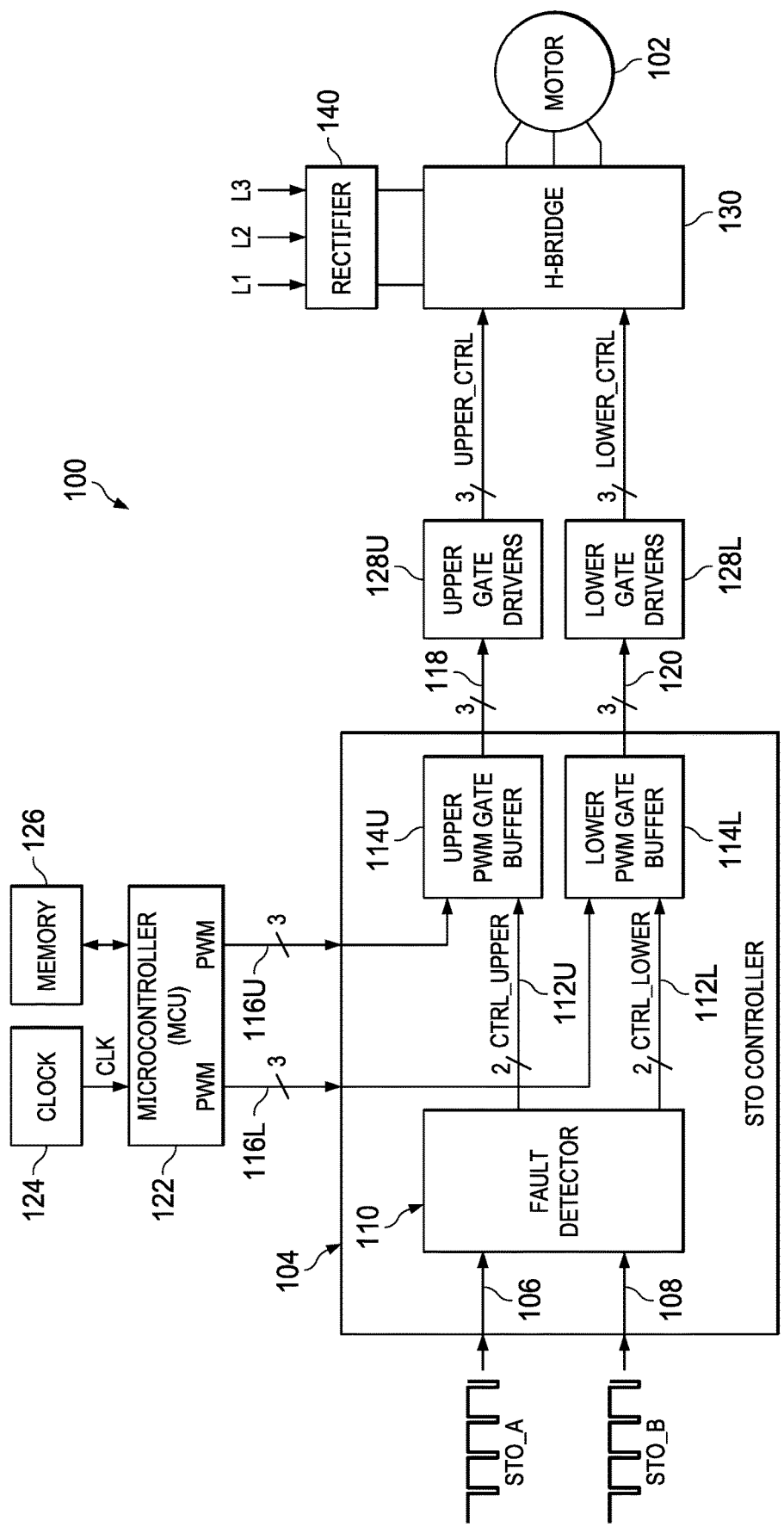
FIG. 1 illustrates an example embodiment motor and control system.

FIG. 1 illustrates an example embodiment motor and control system 100. The system 100 includes a motor 102 that may operate under normal conditions to rotate as part of an electromechanical apparatus. The motor can be any type of AC or DC motor with a corresponding power switch configuration, such as a 3-phase H-bridge or a 2-phase H-bridge. The motor 102 is driven and controlled by other aspects in FIG. 1. For example, the system 100 also includes a safe torque off (STO) controller 104 that has a first input 106 connected to a first STO signal STO_A and a second input 108 connected to a second STO signal STO_B. STO signals are used in motor control, typically for safety reasons, and may be provided, for example, by a separate device or devices such as a programmable logic controller (PLC) (not shown), that may be connected in a feedback manner to monitor the operation of the motor 102. In the example embodiment, the STO controller 104 includes circuitry and functionality that monitor and respond to the STO signals as detailed in the remainder of this document. More particularly, within the STO controller 104, both STO signals STO_A and STO_B are connected to a fault detector 110. The fault detector 110 is preferably hardware-based and provides at least one direct path of control that may disable operation of the motor 102, for example so as to allow the motor 102 to coast to a stop in the event a fault is detected. An example embodiment of hardware to achieve such control is detailed later, as are multiple types of faults that may be detected. The fault detector 110 provides control signaling CTRL_UPPER to a control input 112U of an upper pulse width modulation (PWM) gate buffer 114U and CTRL_LOWER to a control input 112L of a lower PWM gate buffer 114L. The upper PWM gate buffer 114U is connected at a signal input 116U to receive a number (e.g., three) of concurrent PWM signals, and the lower PWM gate buffer 114L is connected at a signal input 116L to likewise receive that number (e.g., three) of concurrent PWM signals. The upper PWM gate buffer 114U is connected at an output 118 to selectively pass, or prevent from passing, the PWM signals at its input 112U, so those signals can drive power devices such as MOSFET, IGBT in an H-Bridge 130, through gate drivers 128U. The lower PWM gate buffer 114L is connected at an output 120 to selectively pass, or prevent from passing, the PWM signals at its input 112L so those signals likewise can drive power devices such as MOSFET, IGBT in the H-Bridge, 130 through gate drivers 128L. In an example embodiment, a microcontroller (MCU)

122 outputs the three PWM signals connected to the signal input 116U of the upper PWM gate buffer 114U and the three PWM signals connected to the signal input 116L of the lower PWM gate buffer 114L. The MCU 122 may be one of various types of motor controllers, including a microprocessor, digital signal processor, or dedicated controller. Generally such devices include programmable and related circuitry and operate as known in the art. In this regard, the system 100 includes a clock 124 that provides a clock signal CLK to the MCU 122, and the MCU 122 is bi-directionally connected to a memory 126 that may include various forms of electronic storage (e.g., read-only memory, random access memory, and so forth). Generally, software/firmware programming of the MCU 122 is achieved by programming stored in either the memory 126 or onboard the MCU 122 itself. In any event, the MCU 122 outputs the six PWM signals, three to the upper PWM gate buffer 114U and three to the lower PWM gate buffer 114L, where each of the PWM signals, can be used to control the power device in the H-bridge 130 to control the power, such as the output voltage or frequency or current, or any of the combinations thereof, supplied to the motor 102, thereby controlling its speed and/or torque.

The output 118 of the upper PWM gate buffer 114U provides one set of outputs of the STO controller 104, and those outputs are connected to upper gate drivers 128U, and the output 120 of the lower PWM gate buffer 114L provides another set of outputs of the STO controller 104, and those outputs are connected to lower gate drivers 128L. The gate drivers 128U and 128L are intermediate power-control devices for controlling power devices in the H Bridge 130 that supply the drive power to start and stop operation of the motor 102. Particularly, as known in the motor control art, in a PWM-controlled motor system typically the PWM signals from the MCU are of lower voltage (e.g., 0V to 3.3V) that as required to control the gate drivers 128U and 128L, which in turn generate the isolated or non-isolated signals (e.g., 0V to 15V or −5v to 15v) to turn ON and OFF the power devices in the H Bridge 130 that drive the motor 102. Power devices in the H Bridge 130 typically include insulated gate bipolar transistors (IBGTs) or metal-oxide-semiconductor field effect transistors (MOSFETs) that drive a motor. Accordingly, and also in the system 100, the PWM signals, which in system 100 are provided from the novel STO controller 104, are used as input signal to the gate drivers 128U and 128L. The gate drivers 128U and 128L switch devices typically comprise transistors that, when enabled or disabled further control the enablement or disablement of the power devices in the H bridge 130. Each PWM signal of the outputs 118 and 120 can have its own independent gate drivers or can be integrated into single or multiple integrated circuit chips. Lines L1, L2, and L3 refer to a 3-phase AC input which can be, for example, but is not limited to, 220 vac, 440 vac, or 690 vac. The 3-phase AC input line power is converted into DC through a rectifier 132. The output of the rectifier 132 is coupled to the H-Bridge 130, which in turn provides power that controls the motor 102. In certain use cases, the H-Bridge 130 can be directly supplied with a DC input, bypassing the rectifier 140. In other use cases, the AC input could be either single phase or 2 phase or 3 phase, or any other number of phases.

Figure 2:
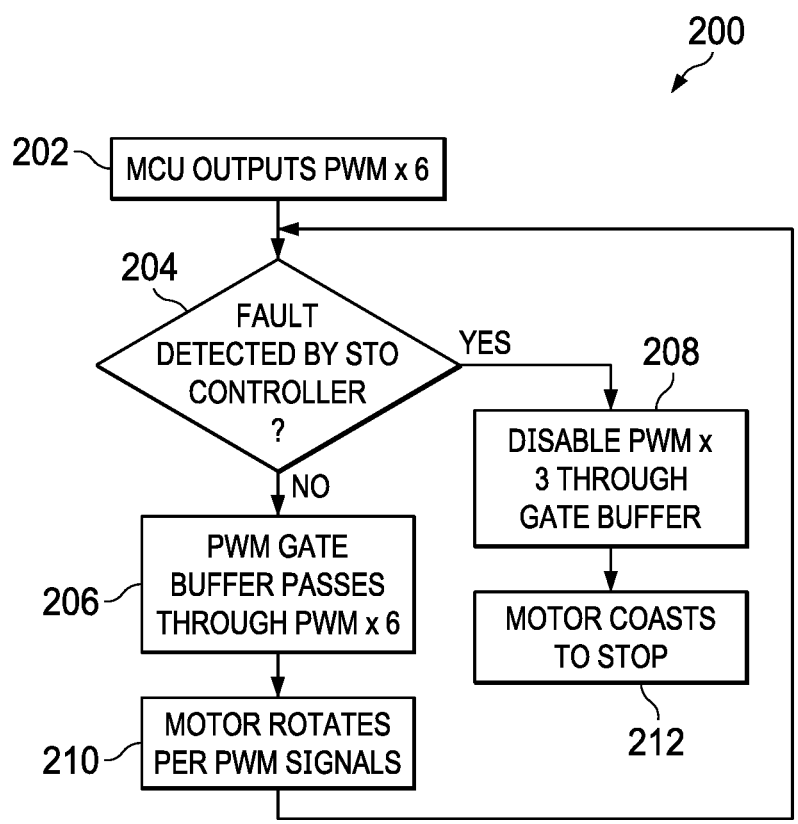
FIG. 2 illustrates a flowchart of a method of operation of the FIG. 1 system.

FIG. 2 illustrates a flowchart of a method 200 of operation of the FIG. 1 system 100. The method 200 starts with a step 202, during which the MCU 122 outputs the six PWM signals, for example in response to programming executed by the MCU 122 art. Accordingly in an example embodiment, the MCU 122 outputs the six PWM signals irrespective of the state of either STO_A or STO_B. Shown earlier, the six PWM signals are output from the MCU 122 and connected to the STO controller 104 and, more particularly, three PWM signals to the input 116U of the upper PWM gate buffer 114U and three PWM signals to the input 116L to the lower PWM gate buffer 114L. Next, method 200 continues from step 202 to step 204.

In step 204, the STO controller 104 checks a condition, namely, whether a fault is detected by the STO controller 104. Accordingly, the step 204 conditional check is not based on programming that is executed by the MCU 122, but instead is under control of the separate STO controller 104. Also, the STO controller 104 fault detection is based on its hardware, rather than or at least independently from a device that requires executable programming (e.g., the MCU 122). The particular type or types of detected faults are detailed below, and can include, for example, an irregularity in the expected duty cycle of either STO_A or STO_B, or in another internal signal, such as a stuck (high or low) condition, that is one persisting beyond an expected predetermined duration, of a signal output within the STO controller 104. If a fault is not detected, the method 200 continues from step 204 to step 206. If a fault is detected, the method 200 continues from step 204 to step 208.

In step 206, with no fault having been detected in step 204, three of the MCU-output PWM signals are passed by the upper PWM gate buffer 114U to the upper gate drivers 128U, and three of the MCU-output PWM signals are passed by the lower PWM gate buffer 114L to the lower gate drivers 128L. In response, the upper gate drivers 128U generate three gate drive output signals (UPPER_CTRL), to control the upper power devices in the H Bridge 130, and the lower gate drivers 128L generate three gate drive output signals (LOWER_CTRL), to control the lower power devices in the H Bridge 130. In response, upper power devices in the H Bridge 130 are enabled and disabled according to the duty cycle of the UPPER_CTRL, and lower power devices in the H Bridge 130 are enabled and disabled according to the duty cycle of the LOWER_CTRL. More specifically, a first pair of UPPER_CTRL and LOWER_CTRL turn on and off transistors in the H Bridge 130 to source the power to a first phase of the motor 102, a second pair of UPPER_CTRL and LOWER_CTRL turn on and off transistors in the H Bridge 130 to source the power to a second phase of the motor 102, and a third pair of UPPER_CTRL and LOWER_CTRL turn on and off transistors in the H bridge 130 to source the power to a third phase of the motor 102, so that in step 210 the motor 102 rotates in response to the sourced power. Following step 210, the method 200 returns to step 204, whereupon the PWM signals continue to be supplied by the MCU 122, and the STO controller 122 continues to determine if a fault is detected. In this regard, note that the method 200 is shown as a sequential flowchart for discussion purposes, but various steps may occur in different order or concurrently, as may be implemented, for example with concurrent operations in logic and state controllers, as may be implemented by one skilled in the art given the teachings of this document.

Step 208 occurs in response to a detected fault, where the fault can be detected and the response applied, with respect to either the upper power devices as controlled by UPPER_CTRL or the lower power devices as controlled by LOWER_CTRL, or both if a fault occurs or is to concurrently disable control of both rails. In step 208, with a fault having been detected in step 204, the six MCU-output PWM signals may still be output the MCU 122, but three of those PWM signals are disabled from passing through a respective one (or six PWM signals if both) of the PWM gate buffers 114U and 114L, to the gate drivers 128U and 128L, with the selection of the disabled buffer (or both) corresponding to whether the fault is detected in the upper or lower rail path. Accordingly, the selected one of the upper and lower gate drivers 128U and 128L maintains the state of, rather than providing a respective set of three PWM signals to, the UPPER_CTRL and LOWER_CTRL, so the power devices in the H Bridge 130 also are not enabled to provide phase power to the motor 102, even while the line powers L 1-L3 are enabled. In response, the motor 102, if previously rotating, will no longer be energized and as shown in step 212 coasts to a stop. Of course, if the motor 102 was already not rotating, then step 208 continues the state of non-rotation of the motor 102. In all events, therefore, steps 208 and 210 demonstrate that following the STO controller 104 detection of a fault, the motor 102 is controlled to stop rotating, by abating the PWM signals to drive it. Additionally, while FIG. 2 does not detail additional steps once the motor stops, various optional steps may be followed given the teachings of this document and the skill in the art. For example, a designer (e.g., original equipment manufacturer customer) implementing the system 100 may choose to perform additional analysis in response to the detected fault. Also noteworthy, however, is that the system 100 will continue to disable the motor 102 so long as the fault remains; accordingly, if such a designer were to not address the fault or think it fixed and continue to provide power to the system 100, the method 200 will continue to safely prevent the motor 102 from rotating.

Figure 3:
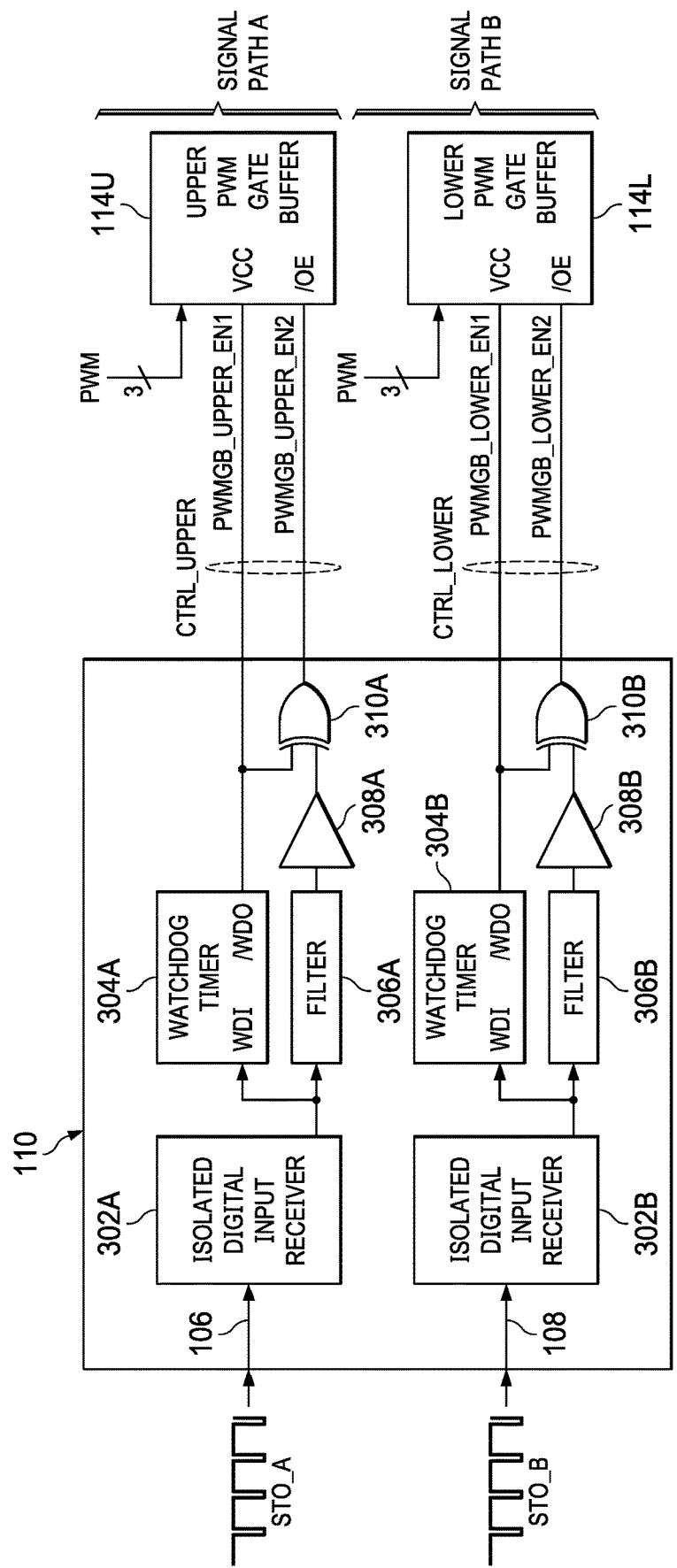
FIG. 3 illustrates additional details of an example embodiment of the FIG. 1 fault detector.

FIG. 3 illustrates additional details of an example embodiment of the FIG. 1 fault detector 110 and the control signaling to the upper and lower PWM gate buffers 114U and 114L. The blocks in FIG. 3 are illustrative but not limiting for purposes of circuit boundaries. For example, portions of the fault detector 110, the upper and lower PWM gate buffers 114U and 114L, and the FIG. 1 upper and lower gate drivers 128U and 128L, all may be integrated into a single device or package, for example having a same voltage domain Such an approach may prove of considerable enhancement in a growing market and allow a system designer to couple the remaining portions of the system 100 to such an integrated device, with favorable implementation efficiency, pricing, and operability. In an alternative embodiment, different of the circuits described may be either discrete elements or integrated together. In any event, STO_A is connected to the first input 106 of the fault detector 110 and is processed along what is shown as a SIGNAL PATH A, and STO_B is connected to the second input 108 of the fault detector 110 and is processed along what is shown as a SIGNAL PATH B. The circuitry of the two SIGNAL PATHS A and B are, in an example embodiment, replicates of one another, where each circuitry set performs a same function but as applied to the respective one of either STO_A or STO_B.

In FIG. 3, and generally from left to right along the SIGNAL PATH A, the first input 106 is connected to an isolated digital input receiver 302A. The isolated digital input receiver 302A may be implemented, for example, by an ISO 1211 commercially available from Texas Instruments Incorporated. The isolated digital input receiver 302A receives STO_A at a relatively high voltage digital input (e.g., 0V to 24V) and outputs a corresponding reduced digital output (e.g., 0V to 3.3V).

The output of the isolated digital input receiver 302A is connected to the data input WDI of a watchdog timer 304A. The watchdog timer 304A may be implemented, for example, by a TPS3430 commercially available from Texas Instruments Incorporated. The watchdog timer 304A has an inverted output value (/WDO) that outputs a first digital value (e.g., /WDO=1) as it counts (e.g., downward) from a first count value to a second count value, and it outputs a second and complementary digital value (e.g., /WDO=0) if the count reaches the second value; however, if a pulse occurs at the watchdog timer 304A data input WDI before the second count is reached, the timer 304A resets to the first count value and re-commences counting, while its output /WDO remains at the first digital value; accordingly, the watchdog timer 304A will maintain its output /WDO at the first digital value, so long as it is reset between starting from its first count and before reaching its second count. In this regard, the watchdog timer 304A parameters are chosen so that, under normal operation when STO_A is pulsing according to an expected frequency (e.g., 1 kHz), the watchdog time count will be reset before the second count is reached, so the output /WDO will remain at the first digital value. Further, the output /WDO provides a part of the UPPER_CTRL signaling from FIG. 1, and that signaling is shown in greater detail in FIG. 3 to include a signal PWMGB_UPPER_EN1, which provides the VCC signal to the upper PWM gate buffer 114U. For sake of example, therefore, consider that PWMGB_UPPER_EN1 is an active high signal (as provided by /WDO) that when high thereby provides the supply voltage (VCC) to the upper PWM gate buffer 114U and when low disables that power, and accordingly also the operation of, the upper PWM gate buffer 114U.

The output of the isolated digital input receiver 302A is also connected to an input of a filter 306A, which as examples, may be a low pass filter (e.g., resistor and capacitor) or a digital glitch filter or operational amplifier based filter. The filter 306A has timing threshold beyond which its input must be sustained in order to switch the filter output state, and that threshold is set to exceed the low duty cycle period of the STO_A and STO_B signals; for example, if those signals have a low duty cycle period of less than 1 ms, then the timing threshold of the filter 306A may be set to 1 ms. Note that the use of 1 ms is by example, as other durations across a wide range may be selected. The output of the filter 306A is connected to an input of a Schmitt trigger buffer 308A. The output of the Schmitt trigger buffer 308A is connected as one input to an XOR gate 310A, and the other input of the XOR gate 310A is connected to the output /WDO of the watchdog timer 304A. The output of the XOR gate 310A also provides a part of the UPPER_CTRL signaling from FIG. 1 and is shown in greater detail in FIG. 3 as a signal PWMGB_UPPER_EN2, which is connected to the inverted output enable /OE of the upper PWM gate buffer 114U. For sake of example, consider that PWMGB_UPPER_EN2 is an active low signal that when low thereby enables the rail operation of the upper PWM gate buffer 114U and when high disables the rail operation of the upper PWM gate buffer 114U. Recalling also that PWMGB_UPPER_EN1 is active high enabling and active low disabling, in an example embodiment the two signals are essentially a logic AND in the sense that to enable the upper PWM gate buffer 114U, both signals must be active (with PWMGB_UPPER_EN1 active high and PWMGB_UPPER_EN2 active low). Conversely, if either of PWMGB_UPPER_EN1 or PWMGB_UPPER_EN2 is inactive, then the upper PWM gate buffer 114U is disabled. While such an implementation is illustrated with one signal as VCC and the other as /OE, other manners may be implemented, for example by reversing those two signals such that PWMGB_UPPER_EN1 drives /OE and PWMGB_UPPER_EN2 drives VCC. In either event or still others, the control signaling can disable the passage of the PWM signals of the MCU 122 from driving the motor 102. In other example implementations, PWMGB_UPPER_EN1 or PWMGB_UPPER_EN2 can be used to switch off or disable the gate driver 128U power supply thereby disabling the passage of the PWM signals of the MCU 122 from driving the motor 102

Also in FIG. 3, and generally from left to right along the SIGNAL PATH B, the circuitry following the second input 108 is, as introduced above, a replicate of the SIGNAL PATH A, but connected to respond in part to STO_B. Accordingly, the SIGNAL PATH B includes an isolated digital input receiver 302B for receiving STO_B and outputting a corresponding lower magnitude waveform to a WDI input of a watchdog timer 304B and also to an input of a filter 306B. The watchdog timer 304B inverted output /WDO provides an active high control signal PWMGB_LOWER_EN1 to the VCC supply of the lower PWM gate buffer 114L. The filter 306B output is connected through a Schmitt trigger 308B which outputs to one input of a logic XOR gate 310B, which has another input connected to the /WDO output of the watchdog timer 304B, and the output of the logic XOR gate 310B provides an active low control signal PWMGB_LOWER_EN2 to the /OE input of the lower PWM gate buffer 114L. PWMGB_LOWER_EN1 and PWMGB_LOWER_EN2 when concurrently active will the lower PWM gate buffer 114L (or the lower gate drivers 128L). Lastly, while the replicate circuitry is shown and described, the circuitry or connections along one path may differ from the other in an alternative embodiment. For example, the connectivity of the PWMGB_LOWER_EN1 and PWMGB_LOWER_EN2 signals, relative to the lower PWM gate buffer 114L may be swapped relative to those comparable signal connections to the upper PWM gate buffer 114U, so that PWMGB_LOWER_EN1 is connected to /OE and PWMGB_LOWER_EN2 is connected to VCC, both of the lower PWM gate buffer 114L, and with appropriate complementary (inverting) changes to the active low or active high effect of each signal.

Figure 4:
FIG. 4 illustrates a truth table of events and various signaling, and as a guide to an operational discussion of the FIG. 3 fault detector.

FIG. 4 illustrates a truth table 400 of events and various signaling, and as a guide to the following operational discussion of the FIG. 3 fault detector 110. The top row of the truth table 400 depicts a conditional state, five node states, and the resultant effect on the FIG. 1 upper PWM gate buffer 114U, namely, whether it is enabled or disabled given the remaining information of the row (the same truth table applies comparably to the lower PWM gate buffer 114L). Beneath the top row are four different possible instances, each described below. Further, the following instances are described with respect to SIGNAL PATH A, and one skilled in the art should then appreciate those descriptions apply likewise to SIGNAL PATH B.

In the first row of instances of the truth table 400, STO_A is pulsed normally, that is, cycling with a greater than fifty percent duty cycle of digital high relative to digital low, and with a low duty cycle period of less than 1 ms. Further, no other fault is occurring in the first instance. The voltage of STO_A is received by the isolated digital input receiver 302A, with a resultant pulsing at the WDI input of the watchdog timer 304A. Accordingly, the counting of the watchdog timer 304A is periodically reset by the normal pulsing of STO_A (scaled by the receiver 302A), so the normal output state of the watchdog timer 304A remains as a digital low and concurrently its inverted value /WDO is a digital high, providing that high as PWMGB_UPPER_EN1 which provides an on-state power supply source VCC to the upper PWM gate buffer 114U. Further, the pulsing STO_A, and the resultant pulsing output from the isolated digital input receiver 302A, is filtered by the filter 306A and, due to the low duty cycle pulsing at a period of less than 1 ms, causes the Schmitt trigger 308A output to remain high. Accordingly, the XOR logic gate 310A receives inputs of a digital high (from /WDO) and a digital high (from the Schmitt trigger 308A output), thereby outputting an active digital low as PWMGB_UPPER_EN2 which is enabling to the /OE input of the upper PWM gate buffer 114U, which together with the active high state of PWMGB_UPPER_EN1, enables the operation of the upper PWM gate buffer 114U. Thus, both the PWMGB_UPPER_EN1 and the PWMGB_UPPER_EN2 signals are active (one high, one low), thereby enabling the upper PWM gate buffer 114U in the first instance. The result is as described above in FIG. 2, steps 206 and 210, in which case the MCU 122 PWM signals are passed through the upper PWM gate buffer 114U to enable the upper gate drivers 128U, thereby causing the motor 102 to rotate (assuming that STO_B is likewise functioning properly so that the lower PWM gate buffer 114L and the lower gate drivers 128L are concurrently enabled by their respective signaling).

In the second row of instances of the truth table 400, STO_A as received by the fault detector 110 is low, for example as may occur when STO_A is active so as to stop rotation of the motor 102 when a corresponding condition has been detected (e.g., overload; excessive motor speed, emergency stop), or in other instances, for example where a device (e.g., controller, cable) providing that signal fails. Further, no other fault is occurring in the second instance. The low, non-pulsing, voltage of STO_A is received by the isolated digital input receiver 302A, with a resultant low digital value, and lack of pulsing, at the watchdog timer 304A WDI input. Accordingly, the counting of the watchdog timer 304A times out by counting from the above-described first count value to the second count value, and upon this timeout condition the non-inverted output state of the watchdog timer 304A is a digital high and concurrently its inverted value /WDO is a digital low, providing that low as PWMGB_UPPER_EN1, which is disabling by discontinuing supply power VCC to the upper PWM gate buffer 114U. Further, the non-pulsing low value of STO_A, and the resultant low digital value output from the isolated digital input receiver 302A, is filtered by the filter 306A and, due to the extended period (e.g., longer than 1 ms) low value, the Schmitt trigger 308A also outputs a digital low. Accordingly, the XOR logic gate 310A receives inputs of a digital low from /WDO and a digital low from the Schmitt trigger 308A output, thereby outputting a digital low as PWMGB_UPPER_EN2 to the /OE input of the upper PWM gate buffer 114U; while that signal could enable the upper PWM gate buffer 114U, because the buffer has no concurrent active power supply VCC, the upper PWM gate buffer 114U remains disabled. The result is as described above in FIG. 2, steps 208 and 212, in which case the MCU 122 PWM signals are not passed through the upper PWM gate buffer 114U to enable the upper gate drivers 128U, and since the motor 102 is not enabled by the upper gate drivers 128U, the motor 102 ceases to rotate (either coasts toward a stop if previously rotating, or remains at a stop if previously not rotating).

In the third row of instances of the truth table 400, STO_A as received by the fault detector 110 is again low as it was in the second instance, which of itself indicates the motor 102 should be controlled to stop, for example by the watchdog timer 304A timing out to render its non-inverted output state high. Also in the third instance, however, it is assumed that instead of timing out, the watchdog timer 304A non-inverted output is stuck in a low state, thereby not serving the intended watchdog and timeout functionality with respect to STO_A. Further, the low non-inverted output corresponds to a concurrent high /WDO output to PWMGB_UPPER_EN1, which is potentially enabling to the supply power VCC to the upper PWM gate buffer 114U. At the same time, however, because STO_A is not is active low (not pulsing), then the resultant low digital value output from the isolated digital input receiver 302A is filtered by the filter 306A and, due to the extended period (e.g., longer than 1 ms) low value, the Schmitt trigger 308A also outputs a digital low. Accordingly, the XOR logic gate 310A receives inputs of a digital high from /WDO and a digital low from the Schmitt trigger 308A output, thereby outputting a digital high as PWMGB_UPPER_EN2, which is disabling to the /OE input of the upper PWM buffer 114U. The result is again as described above in FIG. 2, that is, a fault is detected in step 204, the MCU 122 PWM signals are not passed through in step 208, and the motor 102 ceases to rotate in step 212.

In the fourth row of instances of the truth table 400, STO_A pulses normally, but at the same time a fault is occurring in that the isolated digital input receiver 302A output is stuck high, with a resultant high digital value, and lack of pulsing, at the watchdog timer 304A WDI input. Accordingly, the counting of the watchdog timer 304A times out by counting from the first count value to the second count value, and upon this timeout condition the non-inverted output state of the watchdog timer 304A is a digital high and concurrently its inverted value /WDO is a digital low, providing that low as PWMGB_UPPER_EN1 which, as connected to VCC of the upper PWM gate buffer 114U, is disabling of that buffer. Concurrently, the stuck high output value of the isolated digital input receiver 302A is filtered by the filter 306A and causes the Schmitt trigger 308A to output a digital high. Accordingly, the XOR logic gate 310A receives inputs of a digital low from /WDO and a digital high from the Schmitt trigger 308A output, thereby outputting a digital high as PWMGB_UPPER_EN2, which also is disabling to the /OE input of the upper PWM buffer 114U, albeit redundantly to the disabling low value of PWMGB_UPPER_EN1. As a result of either disabling signal, the upper PWM gate buffer 114U does not pass the MCU 122 PWM signals through to the upper gate drivers 128U, and the motor 102 is not driven and as a result it ceases to rotate.

From the above, example embodiments include a motor drive controller and, more particularly, a hardware based controller that may operate to cease motor rotation, independent of any control signaling from the PWM signal producing processor and any software required to operate that processor. The motor drive controller hardware in one instance can cease motor rotation in response to a STO signal. Accordingly, dual independent channels of STO_A and STO_B are processed and the response provides fault tolerance, without the use of processor-based software, with a safety integrity level (SIL) equal to, or greater than, two. Additionally or alternatively, the motor drive controller hardware in another instance or instances can cease motor rotation in response to other conditions, such as in response to a fault(s) in a controller component. Further, while the above-described attributes are shown and described, changes are also contemplated. For example, while a fault detector hardware herein implements a watchdog timer, an alternative implementation implements astable or monostable circuitry, while still others are ascertainable, from the teachings herein, by one skilled in the art. Accordingly, additional modifications are possible in the described embodiments, and other embodiments are possible, within the scope of the following claims.

What is claimed is:
1. A system, comprising:
a first controller;
a second controller coupled to the first controller, the second controller comprising:
a receiver configured to receive a motor control signal from the first controller;
a watchdog timer that includes an input coupled to the receiver and an output;
a filter that includes an input coupled to the receiver; and
a gate buffer that includes:
a first enable input coupled to the output of the watchdog timer;
a second enable input coupled to the output of the watchdog timer and to the output of the filter; and
an output configured to output a gate driver signal.
2. The system of claim 1, further comprising a gate driver coupled to the output of the gate buffer.
3. The system of claim 2, further comprising a power H-bridge circuit coupled to the gate driver.
4. The system of claim 3, further comprising a motor coupled to the power H-bridge circuit.
5. The system of claim 1 wherein the receiver comprises a first receiver, the motor control signal comprises a first motor control signal, the watchdog timer comprises a first watchdog timer, the filter comprises a first filter, the gate buffer comprises a first gate buffer; and further comprising:
a second receiver configured to receive a second motor control signal;
a second watchdog timer having an input coupled to the second receiver;
a second filter that includes an input coupled to the second receiver; and
a second gate buffer having a control input coupled to an output of the second watchdog timer and configured to output a gate driver signal.
6. The system of claim 1 wherein the gate driver signal comprises a set of pulse width modulation (PWM) signals.
7. The system of claim 1 further comprising XOR logic that includes:
a first input coupled to the output of the watchdog timer;
a second input coupled to the output of the filter; and
an output coupled to the second enable input of the gate buffer.
8. The system of claim 7 further comprising a Schmitt trigger buffer coupled between the output of the filter and the second input of the XOR logic.
9. The system of claim 1, wherein:
the gate buffer includes a pulse width modulation input and a pulse width modulation output;
the first controller is coupled to the pulse width modulation input of the gate buffer to provide an input pulse width modulation signal; and
the gate buffer is configured to provide an output pulse width modulation signal at the pulse width modulation output that is based on the input pulse width modulation signal and gated based on a signal at the first enable input and a signal at the second enable input.

10. A motor system, comprising:
an input for a motor control signal;
controller circuitry that includes:
- a watchdog timer that includes an input coupled to the input of the motor system and an output;
- a filter that includes an input coupled to the input of the motor system and an output; and
- a gating circuit that includes:
  - a first enable input coupled to the output of the watchdog timer; and
  - a second enable input coupled to the output of the watchdog timer and to the output of the filter; and
  - an output for providing an output set of pulse width modulation signals configured to disable motor rotation, in response to the motor control signal;
a gate driver coupled to the output of the gating circuit of the controller circuitry; and
a bridge circuit coupled to the gate driver and to a motor.

11. A method, comprising:
receiving, by a receiver, a safe torque off (STO) signal;
determining whether the STO signal comprises a fault;
in response to the STO signal not comprising the fault:
  enabling a gate buffer based on a first enable input from a watchdog timer and a second enable input from logic circuitry coupled to the watchdog timer and to a filter;
  transmitting a plurality of pulse width modulation (PWM) signals to the gate buffer from a microcontroller;
  generating and transmitting, by the enabled gate buffer, a plurality of gate drive output signals;
in response to the STO signal comprising the fault:
  disabling the gate buffer based on the first enable input from the watchdog timer and the second enable input from the logic circuitry coupled to the watchdog timer and to the filter; and
  maintaining a state of the plurality of gate drive output signals from the disabled gate buffer.

12. The method of claim 11, further comprising: in response to the STO signal comprising a fault, disabling the plurality of PWM signals from passing through the disable gate buffer.

13. The method of claim 11, wherein the gate buffer is coupled to the watchdog timer and to the logic circuitry.

14. The method of claim 11, wherein the STO signal comprises a first STO signal, the receiver comprises a first receiver, the gate buffer comprises a first gate buffer, the watchdog timer comprises a first watchdog timer, the logic circuitry comprises a first logic circuitry, the filter comprises a first filter, the fault comprises a first fault, the plurality of PWM signals comprises a first plurality of PWM signals, a plurality of gate drive output signals comprises a first plurality of gate drive output signals, and the method further comprising:
receiving, by a second receiver, a second STO signal;
determining whether the second STO signals comprises a second fault;
in response to the second STO signal not comprising the second fault:
  enabling a second gate buffer based on a first enable input from a second watchdog timer and a second enable input from second logic circuitry coupled to the second watchdog timer and to a second filter;
  transmitting a second plurality of PWM signals to the second gate buffer from the microcontroller;
  generating and transmitting, by the enabled second gate buffer, a second plurality of gate drive output signals;
in response to the second STO signal comprising the second fault:
  disabling the second gate buffer based on the first enable input from the second watchdog timer and the second enable input from the second logic circuitry coupled to the second watchdog timer and to the second filter; and
  maintaining a state of the second plurality of gate drive output signals from the disabled second gate buffer.

15. The method of claim 14, wherein the first plurality of gate drive output signals is different from the second plurality of gate drive output signals.

16. The method of claim 11, wherein transmitting the plurality of gate drive output signals comprises transmitting the plurality of gate drive output signals to a power H bridge.

17. The method of claim 11, wherein the fault comprises an irregularity in a duty signal of the STO signal.

18. The method of claim 11, wherein determining whether the STO signal comprises the fault comprises:
outputting a first digital value while decrementing a counter from a first count value to a second count value;
output a second digital value when the counter equals the second count value;
detecting a pulse at an input of the watchdog timer; and
in response to detecting the pulse at the input of the watchdog timer, if the counter is greater than the second count value, resetting the counter to the first count value.

19. The method of claim 18, wherein the second digital value indicates the STO signal comprises the fault.

20. The method of claim 11, wherein the logic circuitry comprises XOR logic that includes:
a first input coupled to an output of the watchdog timer;
a second input coupled to an output of the filter; and
an output coupled to the second enable input of the gate buffer.

* * * * *